United States Patent [19]
Morel

[11] 3,978,545
[45] Sept. 7, 1976

[54] SWEEPING AND LIFTING DEVICE FOR GATHERING CUT GRASS AND THE LIKE

[76] Inventor: Jean Alexandre Morel, 5 Rue de Malherbe, 76100 Rouen (Seine-Maritime), France

[22] Filed: July 8, 1975

[21] Appl. No.: 594,028

Related U.S. Application Data

[63] Continuation of Ser. No. 428,417, Dec. 26, 1973, abandoned.

[30] Foreign Application Priority Data

Dec. 26, 1972 France .............................. 72.47153

[52] U.S. Cl. .................................... 15/83; 56/364
[51] Int. Cl.² .......................................... E01H 1/04
[58] Field of Search ............ 15/79, 83, 340; 56/344, 56/364

[56] References Cited
UNITED STATES PATENTS

| | | | |
|---|---|---|---|
| 1,085,475 | 1/1914 | Pezzetti | 15/84 |
| 1,328,521 | 1/1920 | Jemmison | 15/83 |
| 1,585,768 | 5/1926 | Clayton et al. | 15/83 |
| 3,201,819 | 8/1965 | Wilgus | 15/83 X |
| 3,670,359 | 6/1972 | Gutbrod | 15/83 X |

FOREIGN PATENTS OR APPLICATIONS 501,386   4/1920   France .................................. 15/83

Primary Examiner—Edward L. Roberts
Attorney, Agent, or Firm—Eyre, Mann, Lucas & Just

[57] ABSTRACT

A device for sweeping and lifting cut grass, leaves, trash and the like from areas such as lawns is disclosed. The device comprises a rotating base brush and at least two rotating upper brushes enclosed in a hollow inclined member. The base brush contacts the surface of the area to be cleaned and lifts the matter to be swept therefrom. The upper brushes collect the matter thrown by the next lower brush and further lift it until it is thrown into a collection receptacle.

12 Claims, 3 Drawing Figures

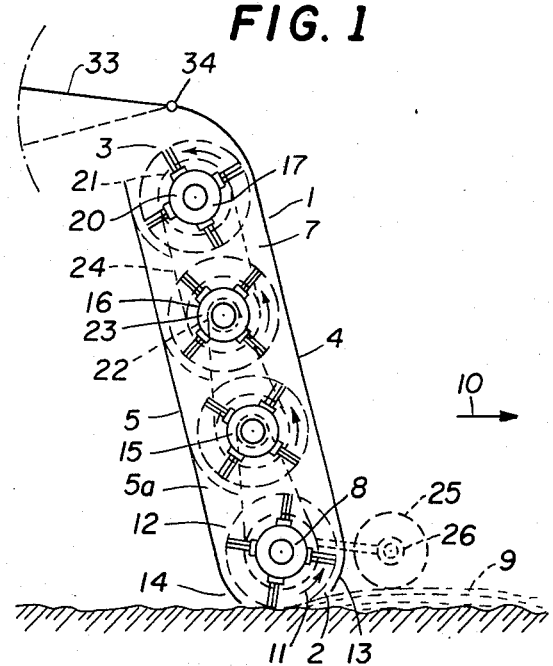
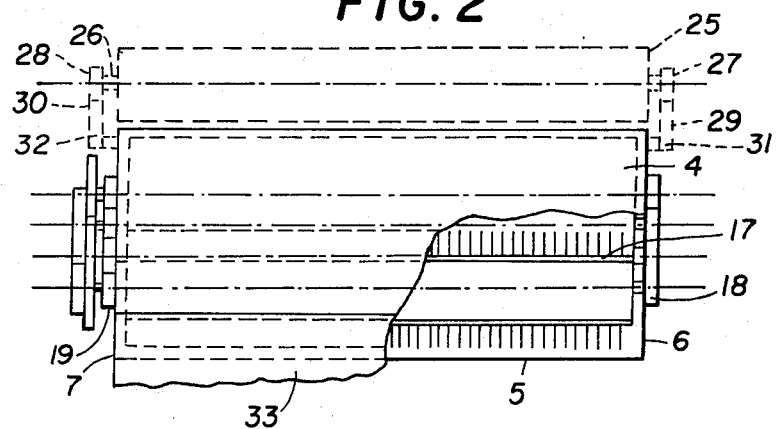
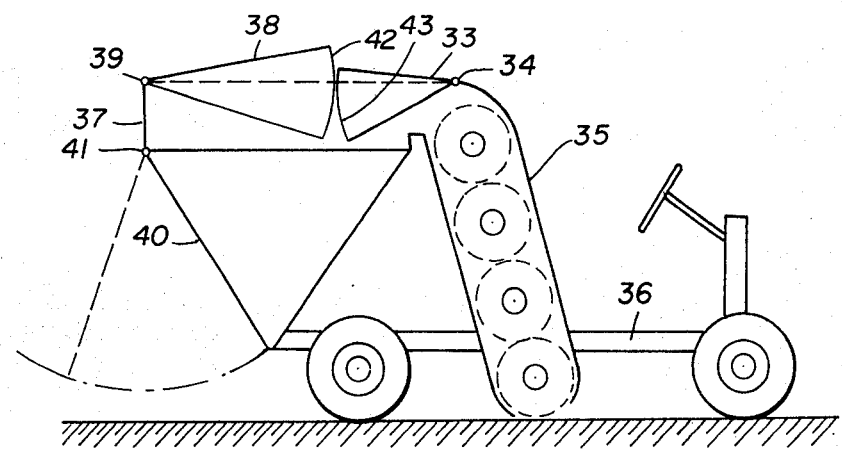

SWEEPING AND LIFTING DEVICE FOR GATHERING CUT GRASS AND THE LIKE

CROSS-REFERENCE TO RELATED APPLICATIONS

This is a continuation of copending application Ser. No. 428,417 filed on Dec. 26, 1973, now abandoned.

BACKGROUND OF THE INVENTION

1. Field of the Invention

The invention disclosed herein relates to sweeping and lifting devices particularly suitable for sweeping and gathering cut grass, leaves and the like from areas such as lawns.

2. Description of the Prior Art

Known devices, whether self-propelled, tractor drawn, or hand moved, are generally provided with a rotating brush which gathers cut grass, leaves or other trash and throws it into a collecting receptacle to be emptied later. In some known machines, the swept matter is introduced into the lower part of the collecting receptacle so that the receptacle is filled from the bottom up. Filling in such a manner makes it difficult, if not impossible, to completely fill the receptacle. To overcome this problem, these known machines were usually large, heavy and complicated, especially the trailer-drawn ones. Other known gathering devices made better use of the volume of the collecting receptacle by filling it from the top using a chain or pneumatics. However, these machines were complicated and expensive to manufacture and the use of an elevator or pneumatic system increased the size, weight and complexity of the device.

The object of the present invention is to obviate these drawbacks through the use of a relatively unbulky sweeping and lifting device which introduces the swept matter into the upper part of the collecting receptacle, thus permitting complete filling of the receptacle and its most efficient utilization.

SUMMARY OF THE INVENTION

The invention is embodied in and carried out by a sweeping and lifting device when comprises a hollow inclined enclosed body open at its lower and upper ends, a first rotating base member placed in the body at the lower end thereof operative to contact the surface to be cleaned and lift the matter to be swept therefrom, a plurality of rotating upper members placed in the body above the base member operative to receive the matter lifted by the base member and further lift it and finally eject it from the body, and means for rotating the base and upper members.

To facilitate passage of swept matter such as twigs, the body is preferably comprised of opposed parallel planar walls.

To increase performance, the rotating members are preferably mounted on a single vertical axis, and are preferably of equal diameter. For best performance, all of the rotating members rotate in the same direction preferably at different speeds, increasing from bottom to top.

Means for preventing the falling of the lifted matter in the body may also be provided for the upper members.

BRIEF DESCRIPTION OF THE DRAWING

The invention is illustrated by way of example in the accompanying drawing which forms part of this application and in which:

FIG. 1 is a cross-sectional view through a vertical plane perpendicular to the axis of the rotating members, of a sweeping and lifting device according to the invention;

FIG. 2 is a plan view of the device, according to the invention, with a portion of the wall of the hollow body cut away; and FIG. 3 is a vertical longitudinal section of a gathering machine equipped with the device according to the invention.

DESCRIPTION OF THE PREFERRED EMBODIMENT

Referring to FIG. 1, a hollow inclined body 1, open at its lower end 2 and at its upper end 3 is shown. Body 1 is enclosed except for its open upper and lower ends by front wall 4, rear wall 5 and side walls 6 and 7 (FIG. 2). Opposed walls 4 and 5 are preferrably parallel and planar, except for their lower end portions 13 and 14, respectively, which are curved inward as will be described hereafter. Use of parallel, planar front and rear walls permits easy passage of the swept materials, especially twigs, sticks, bottles, and large quantities of grass or leaves.

A base rotating member 8 is placed at the lower end of body 1 and is positioned therein to contact the surface of the area and matter 9 to be swept. The member 8 rotates in a counter-clockwise direction (arrow 11) when viewing the device as it moves forward from left to right (arrow 10). Base rotating member 8 is preferably a rotating brush provided with resilient filaments such as hair tufts 12 or the like. Member 8 may also be provided with paddles or other suitable means for sweeping and lifting the matter to be swept.

In order to improve performance, the ends 13 and 14 of walls 4 and 5, respectively, are curved inwardly to reduce the opening 2 or the lower end of body 1. The curved ends 13 and 14 are approximately parallel to a portion of the trajectory made by the periphery of member 8 as it rotates.

Above the base member 8 in body 1, a plurality of upper rotating members 15, 16, 17 are placed. It will be understood that at least two such members are required in addition to member 8. By way of example, three upper rotating members are shown. Similar to base member 8, upper members 15–17 are preferably rotating brushes provided with hair tufts or the like. Upper members 15–17 may also be provided with paddles or other suitable means for further lifting the swept material.

In the preferred embodiment, base member 8 and upper members 15–17 have the same outside diameter and the distance between walls 4 and 5 is slightly larger than this diameter.

Each member 8, 15–17, is supported by a shaft whose axis is ordinarily horizontal, or parallel to the surface to be swept i.e., normal to the direction of side walls 6,7. The shafts themselves are parallel to each other and turn in bearings 18, 19, (member 17), fixed to walls 6 and 7 of body 1 (FIG. 2). The axes of rotation of each rotating member are preferably arranged on a single line parallel to the front and back walls and essentially median therebetween.

Each member preferably turns in the same direction (counter-clockwise when viewing the device moving forward from left to right) with identical or preferably different speeds, increasing from bottom to top. A motor, not shown, actuates the shaft 20 of the uppermost member 17. Pulleys 21, 22 are respectively fixed to the shaft 20 of member 17 and to the shaft 23 of member 16 and are connected by driving belt 24. This arrangement serves to actuate member 16. Similar arrangements actuate members 15 and 8, and by means of different size pulleys, shown schematically, the members can be made to rotate at different speeds with the base member 8 rotating at the slowest speed.

The lower part of the periphery of base rotating member 8 contacts the matter 9 to be swept and sweeps it upward inside body 1. The matter is then thrown into contact with the next rotating member 15 which again throws the matter and moves it towards the top of body 1. Similarly, the matter is thrown and moved towards the top of body 1 by rotating members 16 and 17. The uppermost member 17 eventually ejects the matter 9 from body 1 through upper opening 3. Thus, matter 9 is continually moved substantially upwards by the rotating members until it is ejected.

Curved deflectors 5a are preferably placed inside body 1 to partially surround the lower part of the rotating members and are fixed to wall 5. The deflectors help to prevent the fall of matter already lifted. In a sense, each member is enclosed in a sheath formed by the walls of hollow body 1 and the curved deflectors 5a.

In order to prevent blowing of the matter to be swept lying directly forward of the device by the wind generated by the rotation of the base member 8, a rotating brush 25 may be provided forward of the base member 8. Brush 25 is freely rotating and mounted on a normally horizontal axle 26. Brush 25 is also freely movable in vertical direction to enable it to follow the contours of the surface to be swept and the different sizes of matter to be swept. By way of example, axle 26 may be mounted in bearings 27 and 28 which are supported by levers 29 and 30, respectively, articulated in socket-joints 31 and 32 on walls 6 and 7, respectively, of body 1.

A deflector 33 may be provided at the upper opening 3 to direct the matter ejected by the uppermost member 17. Deflector 33 is pivotally mounted on axle 34, which is normally horizontal.

The sweeping and lifting device described herein may be fitted on a vehicle which is trailer-drawn, self-propelled or hand movable. A self-propelled vehicle is shown in FIG. 3, wherein the motor of the vehicle actuates the rotating members of the sweeping device. The matter, swept and lifted by the device 35, is ejected through the upper opening of the hollow body of this device into a collecting receptacle 37, carried by the vehicle. The receptacle 37 is provided with an upper cover 38 articulated around a hinge 39 and with an emptying door 40 pivoting around an axle 41. In order to avoid lateral displacement of the matter thrown by the device 35 into the receptacle 37, the cover 38 and the deflector 33 are preferably provided with lateral walls 42 and 43 respectively.

The advantages of the present invention, as well as certain changes and modifications of the disclosed embodiment thereof, will be readily apparent to those skilled in the art. It is the applicant's intention to cover by the claims all those changes and modifications which could be made to the embodiment of the invention herein chosen for the purposes of the disclosure without departing from the spirit and scope of the invention.

What is claimed is:

1. In a sweeping and lifting device for gathering loose matter from a surface
    a. a hollow, inclined, essentially rectangular body having, front and rear and side walls and upper and lower ends which are open;
    b. a rotating base member disposed in said body at the lower end thereof operative to contact the surface and the loose matter, and to sweep the matter from the surface and throw it up in the said body;
    c. at least two rotating upper members disposed one above the other in said body above said base member each said upper member being operative to receive the matter thrown up by the member disposed below, and further throw the matter upward, the uppermost member ejecting the loose matter from said body; and
    d. means for rotating said base and upper members in the same direction.

2. The device according to claim 1, wherein said front and rear walls are planar and parallel.

3. The device according to claim 1, further comprising axles on which said base and upper rotating members are supported, said axles being positioned in line substantially median between the front and back walls.

4. The device according the claim 1, wherein said means for rotating said members is operative to rotate at least two said rotating members at different speeds and said base member is rotated at the lowest speed.

5. The device according to claim 1, wherein at least said base member comprises a brush operative to be rotated.

6. The device according to claim 1, wherein said base and upper members comprise brushes of equal diameter.

7. The device according to claim 1 further comprising means for preventing the blowing of the matter directly forward of said base member.

8. The device according to claim 7, wherein the preventing means comprises a freely rotating and vertically movable brush positioned forward of said base member.

9. The device according to claim 1 further comprising means for assisting in preventing matter lifted by said base and upper members from falling.

10. The device according to claim 9, wherein said assisting means comprises at least one curve deflector fixed to said rear wall of said body and positioned to partially surround at least the lower portion of said members.

11. The device according to claim 1 further comprising a deflector positioned at said upper end of said body, said deflector being pivotally mounted to said body and movable about a substantially horizontal axis.

12. The device according to claim 11, wherein said deflector includes lateral walls.

* * * * *